July 14, 1970   KARL-HEINZ LIEBERT   3,520,135
MULTICYLINDER POWER STEERING SYSTEM
Filed March 19, 1969                                    4 Sheets-Sheet 1

INVENTOR:
K.H. Liebert
ATTORNEY:

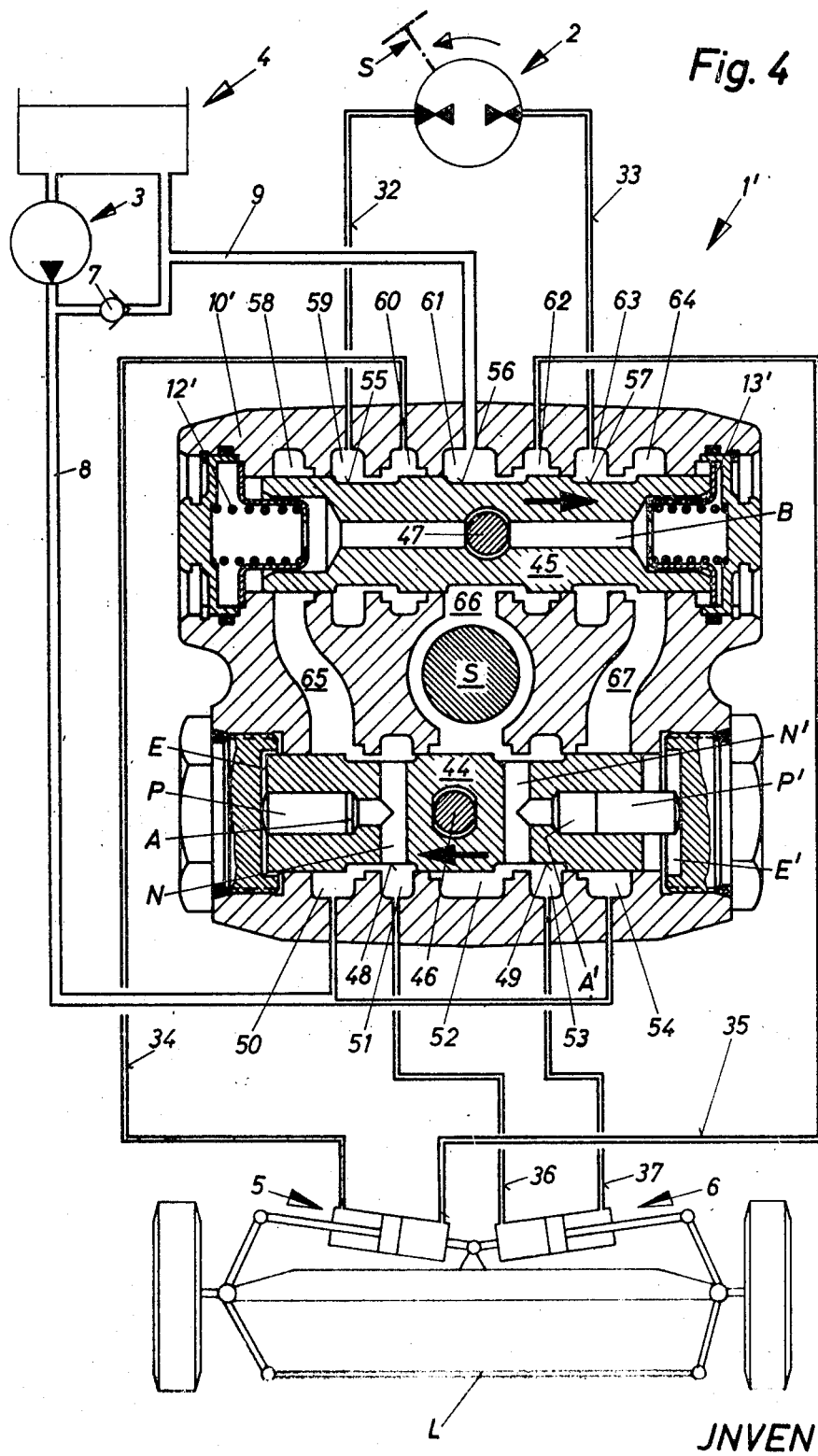

United States Patent Office 3,520,135
Patented July 14, 1970

3,520,135
MULTICYLINDER POWER STEERING SYSTEM
Karl-Heinz Liebert, Schwabisch Gmund-Wetzgau, Germany, assignor to Zahnradfabrik Friedrichshafen, Aktiengesellschaft, Friedrichshafen, Germany, a corporation of Germany
Filed Mar. 19, 1969, Ser. No. 808,508
Claims priority, application Germany, Mar. 23, 1968, 1,755,033
Int. Cl. F15b *15/18;* B62d *5/00*
U.S. Cl. 60—50                                7 Claims

ABSTRACT OF THE DISCLOSURE

The invention provides for multicylinder steering booster operation in which the pistons, e.g., of a dual cylinder system are tied together via the steering linkage mechanism. A main pressure source, i.e., a servopump, and a control or metering pump in conjunction with a valve means are utilized such that one cylinder is pressure fed via the control pump which has an inlet feed from the servopump while the other cylinder is pressure fed via the valve means directly from the servopump. Thus the pressure fluid for the latter cylinder bypasses the control pump which feeds to one, only, of the cylinders in any plural arrangement.

---

In general, power steering systems of the type disclosed herein utilize a main pump driven by a vehicle engine, referred to as a servopump and a control or metering pump. By means of a valve control arrangement, flow from the servopump is fed to the control pump which is a gear type so that flow therefrom is under positive pressure and control and the output therefrom is in response to rotation of the control pump at a rate strictly dependent on the rate of rotation. Rotation of the control pump is achieved by the steering spindle, manually effected by a vehicle operator. The output of the control pump feeds to a hydraulic servomotor which actuates a steering mechanism that effects turning of the vehicle wheels to accomplish left and right turns.

Accordingly, the output of the main pump is used for power boost purposes via the servomotor, but this output must pass through the control pump before being fed to the servomotor. Since the control pump can have an output only when rotated by the steering spindle, and since it is a positive displacement pump, it has the effect of feeding the servomotor at a controlled or "metered" rate. The net result is that the vehicle wheels are turned in a steering movement to a degree proportional to the degree of rotation of the steering spindle.

Output from the control pump is controlled via valving to the servomotor, and in the case of the present invention such valving also controls flow from the servopump to the control pump in a spool valve construction requiring no more than two additional grooves beyond that which would be required in a system of the same general type but not having the particular advantages of the system disclosed herein, as will be subsequently explained.

The principal feature of the invention resides in the fact that a single control pump unit can be utilized for metering a multiplicity of servomotors wherein the control pump performs the usual function of effecting a steering movement of the vehicle wheels which is proportional to the amount of rotation of the steering wheel by the vehicle driver. In the prior art there are arrangements where a single control pump effects this purpose for a dual power cylinder booster mechanism, but such prior art arrangements require an increase in the size of the control pump.

A prior art patent such as U.S. Pat. 2,974,491 utilizes a system wherein special throttles are provided for proportional flow from the main pressure pump, i.e., the servopump, between the control pump and a servomotor wherein the output of the control pump is fed to the servomotor also. However, in that arrangement the combining of flow from the control pump output and the servopump output produces erratic effects and cannot be relied on for constant discharge rate or pressure. Another prior art patent, U.S. Pat. 3,249,173, provides a system that requires a pair of large servopumps in order to effect uniform flow characteristics wherein one such pump is actuated in response to differential pressure cross the control pump. This is, of course, a space consuming and relatively expensive combination and one which does not take advantage of the control pump to maximum effect for metering purposes to produce proportional steering movement of the vehicle wheels as the steering wheel is rotated by the driver. In the system as just described the control pump serves primarily to produce a differential pressure for shifting valves which cut the servopumps in or out of the system as required, sacrificing large delivery volume.

The present invention overcomes the drawbacks of the prior art in a very simple and economical manner by utilizing a valve arrangement such that the control pump is fed by the main pump, i.e., a servopump and performs its metering function only as to one servomotor of a multi-cylinder system to which the control pump output feeds. Referring, for purposes of discussion to a double acting cylinder or servomotor steering arrangement utilizing two cylinders, the pistons of the cylinders are connected to each other through the steering linkage. Therefore, they must move in unison and the metering for proportional vehicle wheel steering motion of the first servomotor necessarly governs movement of the second servomotor fed directly by the servopump. Thus, any number of servomotors which are tied mechanically via their pistons to that of the first servomotor and receiving pressure fluid which bypasses the control pump can be utilized in a system.

Accordingly, it will be apparent that a single relatively small control pump can achieve proportional movement of a multiplicity of power cylinders by the practise of the invention. Further, insofar as vehicle steering is concerned, the invention can be carried out in an arrangement where valve actuation is effected by pressure from the control pump or by mechanical coupling to the steering spindle itself.

The simpliicty and economy of the invention is effected by the use of spool valves having passages comprising grooves coacting with housing grooves and in a completely symmetrical arrangement. The grooves are provided in sets wherein one set controls a fluid system which includes a first servomotor fed by flow from the servopump through the control pump, and a second set of grooves which controls a fluid system having as its pressure fluid flow only from the servopump fed directly to one or more cylinders acting in concert and having pistons mechanically linked with the first cylinder.

The actual change of prior art valve control components involve only additional grooving in the valve spools and housing and no special components or devices are employed. Further, when the system is positioned for straight ahead steering, the first servomotor, i.e., the metered servomotor, is hydraulically blocked from movement and due to the mechanical connection between the piston thereof and the piston of any other servomotor in the system, the latter servomotor piston is also blocked from movement.

A detailed description of the invention now follows in conjunction with the appended drawing in which.

Figure 1:
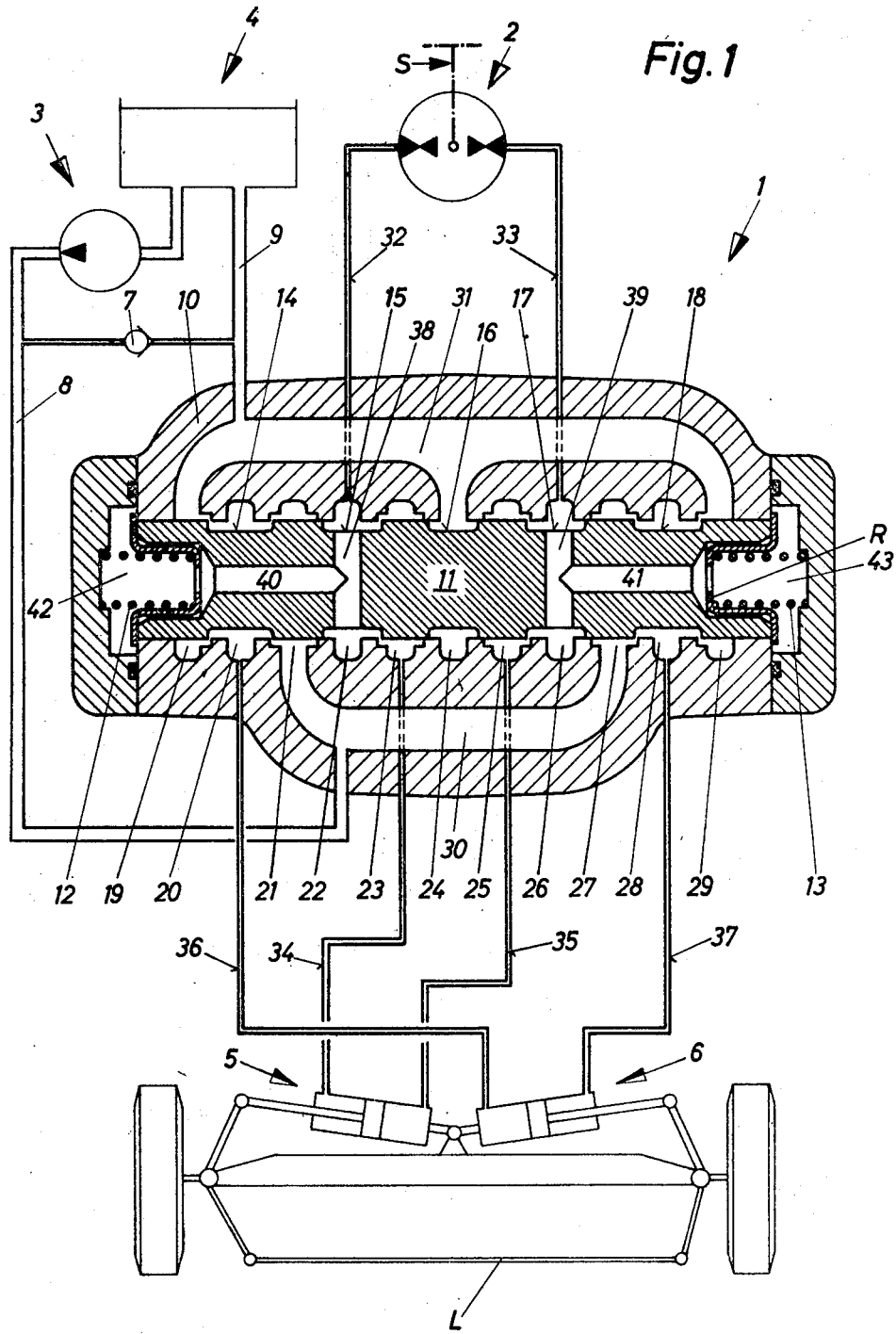
FIG. 1 is a diagrammatic illustration of the essential components of one form of the invention, wherein the valve means is shown in longitudinal cross-section in neutral position, such modification being arranged for pressure actuation of the valve means.

Referring to FIG .1, the arrangement of the system comprises a control valve 1 having the housing 10 which may be of conventional split type construction for slidably accommodating the spool valve 11 wherein the spool valve and housing have sets of coacting grooves provided in a well-known manner and functioning as later described.

The arrangement provides a control pump 2 which will be understood to be reversibly actuatable as by the steering spindle S and being any well known type of gear pump utilized in systems of this kind. The control pump connects via lines 32 and 33 to grooves 22 and 26, respectively, cut into the housing and coacting with respective grooves 15 and 17 of the valve spool 11. Also provided exteriorly of the housing is the oil tank or reservoir 4 for feeding the input of the main pump or servopump 3 which connects via line 8 to a pressure chamber 30 in the housing and which, in turn, connects at its ends to housing grooves 21 and 27.

The housing is also provided with an exhaust chamber 31 connecting via line 9 with the tank 4 and it will be appreciated that while the several grooves mentioned are peripherally continuous, the pressure and exhaust chambers are isolated from each other by the use of a split housing having a lower and an upper portion bolted in any suitable manner (not shown). The exhaust chamber connects at its ends with spool grooves 14 and 18 in the neutral position of FIG. 1. A pair of housing grooves 23 and 25 connect with the ends of the double acting servomotor cylinder 5, which for purposes of the present description will be referred to as the primary servomotor, while the housing grooves 20 and 28 connect with the ends of what may be termed a secondary servomotor 6, likewise a double acting power cylinder. The connections to servomotor 5 are via lines 34 and 35 and to servomotor 6 are via lines 36 and 37.

The outermost grooves 19 and 29 at both ends of the housing will be seen to connect to the exhaust chamber 31 when the valve spool is in the neutral position shown in FIG. 1. Neutral position is maintained by springs 12 and 13 in respective chambers 42 and 43 provided by the end caps shown wherein the springs are retained as by cup retainers R.

The valve spool 11 has a groove 16 centrally thereof for coacting with a housing groove 24 leading to the exhaust chamber and also has radial bores 38 and 39 normally aligned with respective grooves 22 and 26 and communicating with respective axial bores 40 and 41. The grooving of the housing and of the valve spool is such as to provide suitable openings and throttling gap areas for pressure buildup in a manner heretofore known when the valve spool is shifted.

The grooving arrangement of the valve spool and the housing is completely symmetrical. Accordingly, a completely static condition is effected in neutral position. Primary servomotor 5 is hydraulically blocked and secondary servomotor 6 is mechanically blocked by the steering linkage L, but shifting of the valve spool 11 in either direction can pressurize respective ends of the servomotors.

In the neutral position shown in FIG. 1, pressure flow from the servopump 3 can readily be traced via line 8 to chamber 30 and thence to passages comprising grooves 21 and 27 and respective grooves 19 and 29 to exhaust chamber 31 and back to tank 4 via line 9. Accordingly there is continuous pressureless circulation and while the ends of cylinder 6 are at this time connected in the circulating flow no pressure is felt in that cylinder because of the short circuiting flow from the pressure chamber 30 to the exhaust chamber 31.

The ends of cylinder 5 are hydraulically blocked at the housing grooves 22 and 26 and are connected therethrough via the valve spool grooves 15 and 17 to respective sides of the control pump 2 which respective sides are also connected to the respective radial bores 38 and 39 of valve spool 11 which connect to respective axial bores 40 and 41 leading to chambers 42 and 43, respectively, at the housing ends.

Upon actuation of control pump 2 by the steering spindle S, a steering function is effected. Thus, referring to FIG. 2 the position of valve spool 11 for a left hand turn is illustrated. It will be noted that the control pump has been rotated in the direction of the arrow whence pressure fluid flows via line 32 and the passage provided by grooves 15 and 22 to the radial bore 38 and thence to the axial bore 40 and into the chamber 42 effecting pressure on valve spool 11, shifting it to the right as shown. There is no hydraulic blockage in chamber 43 since fluid in that chamber can find its way out via bores 41 and 39 and the passage provided by grooves 17 and 26 to the input side of the control pump 2 via line 33. The shifting of the valve spool by the differential pressure created by the control pump opens a passage via grooves 14 and 20 whereby pressure fluid from chamber 30 fed by servopump 3 can pass via line 36 to the left end of secondary cylinder 6, while the right end discharges via line 37 and the passage effected by grooves 28 and 18 to chamber 31 and line 9 to the tank 4. Accordingly there is direct pressure feed from servopump 3 to the secondary servomotor 6 completely by-passing the control pump 2. However, the shifting of valve spool 11 has also opened a passage via grooves 26 and 17 (as well as some flow through bore 39) to line 33 and thence to the inlet side (at that time) of control pump 2. The actuation of control pump 2 thus forces the inlet feed into line 32 at slightly increased pressure to a passage comprised of grooves 22 and 15 and thence to groove 23 (with some flow through bore 38) whence it flows into line 34 to the corresponding or left hand end of primary servomotor 5. The right hand end of primary servomotor 5 exhausts via line 35 to the passage provided by grooves 25, 24, and 16, into exhaust chamber 31 and thence via line 9 to tank 4.

Accordingly the vehicle will execute a left hand turn. For a right hand turn, opposite rotation of control pump 2 causes an opposite shift of the valve spool and flow through the various grooves are reversed to pressurize the right hand ends of the servomotors and exhaust the left hand ends. This is, of course, due to the completely symmetrical arrangement of the valve spool and housing grooves.

A check valve 7 is located between the pressure line 8 and tank line 9 so that in the event of breakdown of servopump 3, pressure fluid can be provided by control pump 2, albeit by manual power. However, steering function is not lost.

From the above description, it will be apparent that the passages are actually provided in sets. Thus there is a set of passages for the servomotor 5 which comprises a system having control pump 2 for pressure feed, and a set of passages for the servomotor 6 which comprises a system having direct pressure feed from servopump 3, each such set of passages providing, of course, for exhaust for both servomotors. The set of passages for servomotor 5 is constituted by grooves 22, 26, 23 and 25 and thus constituting one fluid control system; while the second set of passages are constituted by grooves 20 and 28, for the servomotor 6, and effects a second fluid control system.

Any number of secondary servomotors 6 can be utilized all connected in parallel with that shown in the drawing; and assuming, of course, that they are mechanically tied as to their pistons with the piston of primary servomotor 5. Accordingly the important feature of the invention, namely, proportional movement of a plurality of servomotors can be accomplished by the use of a single control pump which meters a single primary servomotor and need not be of any size other than that ordinarily required for the metering of a single servomotor.

Figure 2:
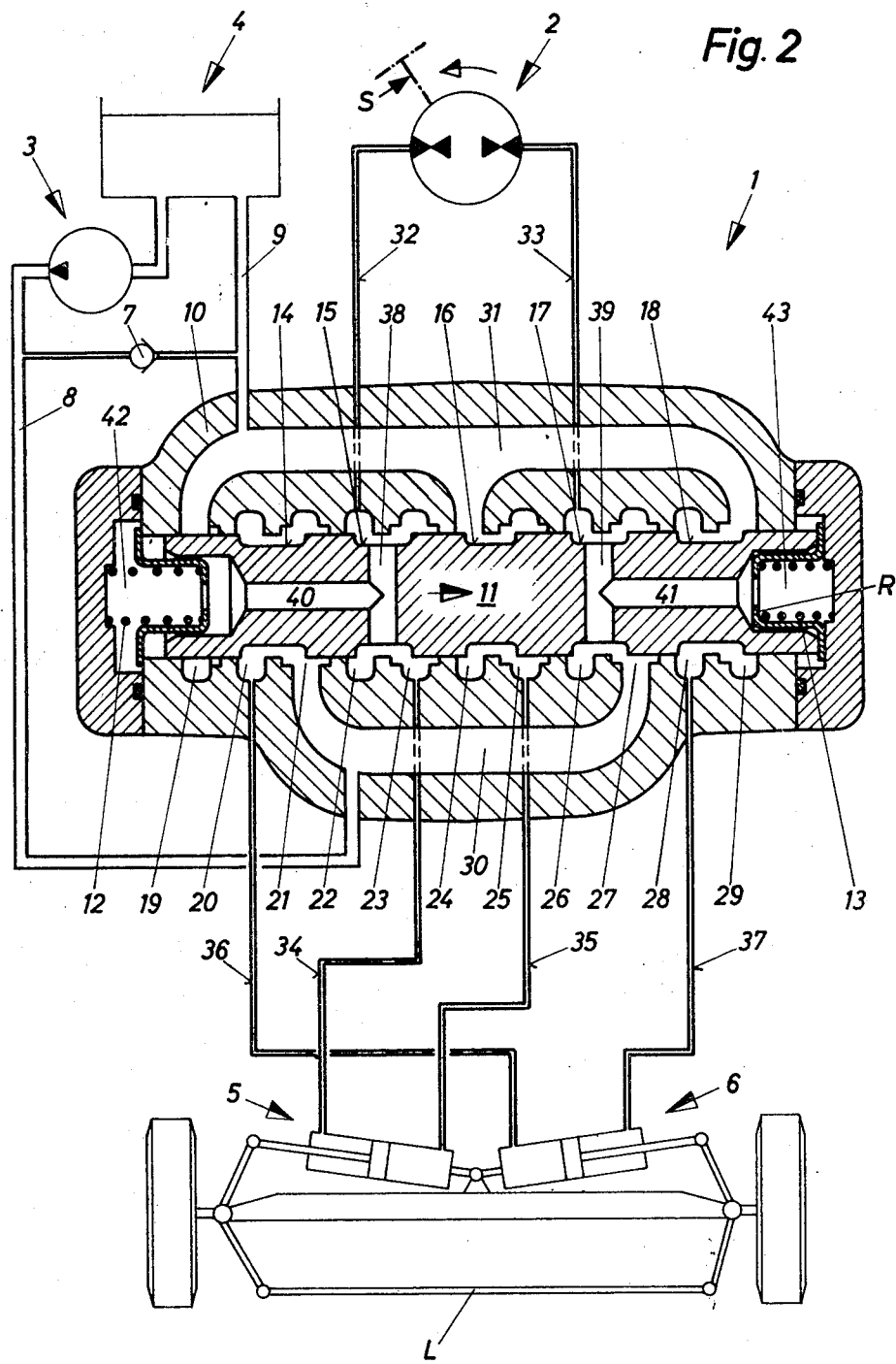
FIG. 2 illustrates the modification of FIG. 1 in the course of effecting a steering operation.
Figure 3:
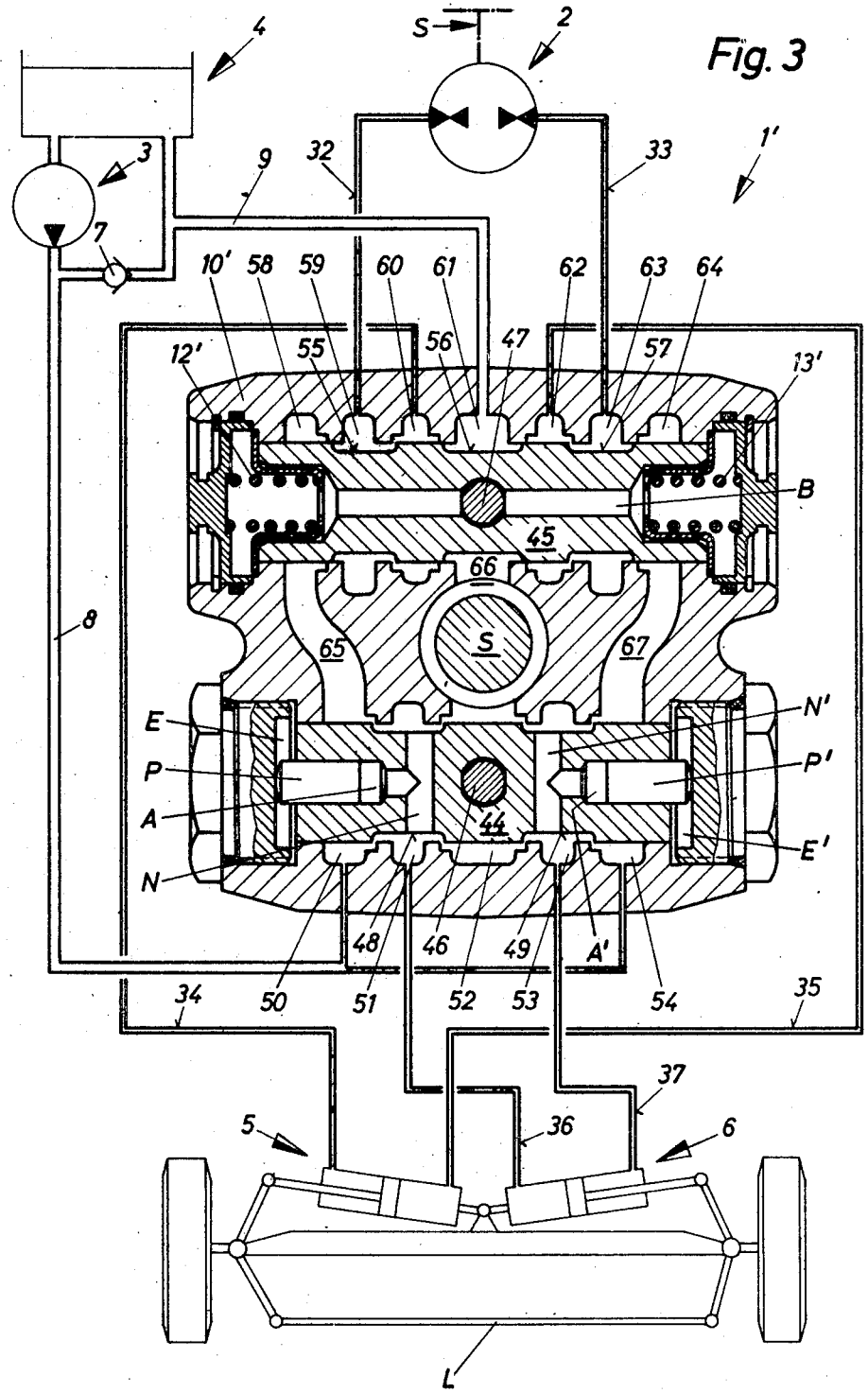
FIG. 3 is a view similar to FIG. 1 but illustrating a modification wherein the valve means is actuated mechanically by the steering spindle and being shown in neutral position; and, FIG. 4 illustrates the modification of FIG. 3 actuated to effect steering.

Referring to the form of the invention shown in FIGS. 3 and 4, reference numerals for components identical to that described for FIGS. 1 and 2 have been carried over and such components need not be again described.

In the modification there is a housing 10' having a pair of bores each of which takes a respective valve spool. Thus the lower bore takes valve spool 44 and the upper bore takes valve spool 45. The spools are mechanically linked by respective pins 46 and 47 to the spindle S of the steering system which is understood to be rotatable by a vehicle driver so that the pins rotate about the axis of the spindle to reciprocate respective valve spools in opposite directions, illustrated by the arrows on the valve spools in FIG. 4.

In this modification there is no pressure operation acting to shift either of the valve spools and the control pump 2 is utilized purely for metering purposes, being connected at its respective sides to the passages constituted by grooves 55, 57 and 59, 63.

The primary servomotor connects via lines as shown to grooves 60 and 62 in the housing surrounding valve spool 45 and the ends of servomotor 6 are connected to grooves 51 and 53 surrounding valve spool 44 and respective grooves 48 and 49. The servopump 3 connects to a passage comprising groove 50 around valve spool 44 and housing channel 65 to the groove 58 around valve spool 45; it also connects to the groove 54 around valve spool 44, effecting a passage with housing channel 67 including the groove 64 around valve spool 45. A central groove 52 surrounds valve spool 44 and forms a passage with an exhaust chamber 66 formed around the spindle S and including the valve spool groove 56 and housing groove 61 for exhaust flow back to tank 4. Thus a completely symmetrical layout of all grooves and passages is effected so that reversible reciprocation of the valve spools effects directional control of the servomotor pistons.

Inasmuch as the valve spools work into sealing chambers at their ends, provision must be made to prevent hydraulic blockage. Thus the valve cylinder 45 is acted on by springs 12' and 13' which centralize it. However, were the steering wheel to be rotated so that the valve spools were shifter, it will be apparent that there will be no hydraulic blockage for valve spool 45 because of the central bore B. On the other hand, to prevent reverse blockage of the valve spool 44 the end chambers E, E' are connected to the exhaust chamber 66 through channels not represented in the drawing. The valve spool 44 is provided with pins P, P' slidably mounted in axial bores A, A' which are pressurized via radial bores N, N' depending upon direction of shift of the valve spool 44. The various passages comprised of the grooves are suitably designed with groove widths effecting throttling gaps to raise pressure from the pressureless condition of FIG. 3 to the working presure condition of FIG. 4 in a manner which will be understood by a person skilled in this art.

The pressureless circulatory flow of FIG. 3 can be readily traced from servopump 3 to grooves 50 and 54, respective grooves 48 and 49, groove 52, to exhaust chamber 66 around the spindle and thence to the passage effected by grooves 56 and 61 to the tank.

In operation, for example, for the left hand turn as depicted in FIG. 4, the spindle S is rotated which will be understood to rotate control pump 2 and at the same time shift valve 44 to the left and valve 45 to the right. The shifting of valve 44 to the right effects an initial control whence pressure fluid flows from servopump 3 via the passages effected by grooves 50 and 48 directly to the left end of secondary servomotor 6 while the right end discharges via groove 53 to exhaust chamber 66 (with some flow through bore N') and thence to the passage effected by groove 56 and 61 to the tank. Thus no fluid from control pump 2 goes to the secondary servomotor 6, the feed therefore bypassing that pump. However, due to the simultaneous shift of spool valve 45 pressure fluid from servopump 3 can follow the path provided by groove 54 and channel 67 to groove 64 and thence to the passage effected by groove 57 and 63 to what is then the inlet side of the control pump 2. The outlet side of the control pump feeds with slightly increased pressure to the passage provided by grooves 59 and 55 and thence to the left end of primary servomotor 5. The right end of servomotor 5 is exhausted via connection to groove 62 and thence to the passage provided by grooves 56 and 61 to the tank.

In either form of the invention it will be apparent that the primary cylinder is fed by pressure fluid all of which must pass through the control pump 2 for metering before pressurizing that servomotor. On the other hand, the pressure fluid for the secondary servomotor bypasses the control pump and goes directly from the servopump to that servomotor.

From the symmetry of the passage arrangement it will be apparent that for a right hand turn opposite shifting of the respective valve spools will pressurize the right hand ends of the servomotors. It will also be apparent that there are likewise two systems involved in the array shown in FIGS. 3 and 4 wherein the primary system for the metering of the servomotor 5 comprises the passages having grooves 59, 55, 60 for pressure and passages comprising grooves 62, 56 and 61 for exhaust, but these functions are reversed if the valves be reversely shifted as compared to the position of the valves shown in FIG. 4. Similarly the secondary system for servomotor 6 comprises passages having grooves 51 and 53 taken in conjunction with respective grooves 48 and 49 and by virtue of the symmetry of the layout functioning either for pressure flow or exhaust flow depending upon direction of shifting of the valve spool 44.

I claim:

1. A multicylinder power steering system comprising at least two double acting servomotor cylinders (5, 6) having pistons connected to each other through a steering linkage mechanism for movement in unison and further comprising a servopump (3) and a control pump (2); a movable valve means having a first set of passages for controlling one cylinder (5) said set comprising a passage (26) for controlling pressure fluid from said servopump (3) to said control pump (2), and comprising a passage (22-23) for controlling pressure fluid from said control pump (2) to said one cylinder (5); and further comprising a passage (25) for effecting exhaust of said one cylinder; said valve means also having a second set of passages comprising a passage (20) for controlling pressure fluid to the other (6) of said cylinders from said servopump (3) and a passage (28) for effecting exhaust of said other cylinder; wherein said control pump is reversibly operable by a steering spindle so that the aforementioned passages can conduct reverse flow for reversing the piston movement of said cylinders.

2. A fluid pressure control system for a plurality of at least two servomotors having connected pistons for synchronized movement; comprising a main pump and a positive displacement control pump; valve means and connections for controlling pressure fluid from said main pump to said control pump and to one servomotor and valve means and connections for simultaneously controlling flow directly from said main pump to the other servomotor, whereby flow to said one servomotor is metered by said control pump and whereby when said control pump is actuated the actuation of said servomotor pistons is proportional to the degree of actuation of said control pump, and whereby the synchronized movement of said servomotor pistons mutually affect the work load of said main pump.

3. A fluid pressure control system as set forth in claim 2, including said servomotors in piston connected combination; wherein said first mentioned valve means comprises an actuatable member having passages for permitting flow to said one servomotor in one position of said member and blocking flow therefrom in another position, whereby said one servomotor piston is then hydraulically blocked against movement and whereby said other servomotor piston is then blocked against movement by virtue of being connected to said one servomotor piston.

4. A hydraulic power control system comprising at least two servomotors having connected pistons for synchronized movement and having a servopump and a positive displacement control pump; a first valve means and connections for controlling pressure fluid from said servopump to said control pump and thence to one servomotor and a second valve means and connections for simultaneously controlling flow directly from said servopump to the other servomotor, whereby flow to said one servomotor is metered by said control pump and whereby when said control pump is actuated the actuation of said servomotor pistons is proportional to the degree of actuation of said control pump.

5. A hydraulic power control system as set forth in claim 4, said servomotors being double ended cylinders; said first and second valve means comprising a single valve spool and a housing therefor; a plurality of grooves on said valve spool and a plurality of respective coacting grooves in said housing surrounding said valve spool; a pair of cylinder control grooves in said housing being connected to said other servomotor; a pair of inlet pressure grooves in said housing next innermost to said first mentioned pair of grooves and being in communication with said servopump:

a pair of control pump flow grooves in said housing next innermost to said inlet pressure pair and being connected to respective sides of said control pump;

a second pair of servomotor grooves in said housing next innermost to said control pump flow pair and being connected to the ends of said one servomotor;

an exhaust groove in said housing disposed intermediate said last pair; and pressure means for shifting said valve spool when said control pump is actuated.

6. A hydraulic power control system as set forth in claim 4, said first and second valve means comprising a movable valve member having an exhaust groove and a housing having a coacting exhaust groove; said valve member having plurality of pairs of grooves and said housing having a plurality of pairs of coacting grooves; all said grooves being in symmetric array so that grooves of each pair are disposed in a corresponding position in relation to said exhaust grooves; wherein one pair of grooves of said housing is connected to said servopump and another pair is connected to the ends of said one servomotor and a further pair is connected to the ends of said other servomotor and a still further pair is connected to said control pump; whereby when said valve is in a neutral position pressureless flow takes place from said servopump to said exhaust grooves and whereby reversible movement of said valve member effects simultaneous pressure flow through said valve member and housing to corresponding ends of servomotors and effects exhaust of respective opposite ends thereof.

7. A fluid pressure control system as set forth in claim 4, said servomotors being dobule ended cylinders; said first valve means comprising a movable member having grooves and having housing means provided with coacting grooves; said second valve means comprising another movable valve member having grooves and having housing means provided with coacting grooves;

the grooves of both said housing means being disposed in an array wherein end grooves of one housing means are connected to respective end grooves of the other housing means and are connected for pressure flow from said servopump; said first mentioned housing means having a pair of control pump flow grooves next adjoining the respective end grooves thereof and which are connected to respective sides of said control pump, and said first mentioned housing means also having a pair of servomotor flow grooves connected to ends of said one servomotor and being disposed inwardly of said control pump flow grooves, and said first mentioned housing means having a single exhaust groove intermediate said last mentioned pair of grooves for exhaust of either end of the one servomotor; said other housing means also having a pair of servomotor flow grooves next adjoining respective end grooves thereof and connected to respective ends of said other servomotor; and said other housing means also having an exhaust groove intermediate said last mentioned pair of grooves for exhaust of either end of said other servomotor; and means for actuating said valve members from a neutral position wherein the grooves thereof coact with respective housing grooves to effect pressureless flow from said servopump to said exhaust grooves, to a position whereat pressure flow is simultaneously conducted to either end of both servomotors which exhausting the opposite ends thereof.

References Cited

UNITED STATES PATENTS

| | | |
|---|---|---|
| 2,020,951 | 11/1935 | Lemon. |
| 2,974,491 | 3/1961 | Cassaday et al. |
| 3,016,708 | 1/1962 | Gordon et al. |
| 3,249,173 | 5/1966 | Gordon. |

EDGAR W. GEOGHEGAN, Primary Examiner

U.S. Cl. X.R.

180—79.2